US012745750B1

(12) United States Patent
Steeneck

(10) Patent No.: US 12,745,750 B1
(45) Date of Patent: Sep. 29, 2026

(54) LIDDED FEED COVER

(71) Applicant: Wade Steeneck, Beresford, SD (US)

(72) Inventor: Wade Steeneck, Beresford, SD (US)

( * ) Notice: Subject to any disclaimer, the term of this patent is extended or adjusted under 35 U.S.C. 154(b) by 0 days.

(21) Appl. No.: 19/097,362

(22) Filed: Apr. 1, 2025

(51) Int. Cl.
*A01K 5/01* (2006.01)

(52) U.S. Cl.
CPC .................................... *A01K 5/01* (2013.01)

(58) Field of Classification Search
CPC . A01K 1/10; A01K 1/105; A01K 5/01; A01K 5/0107; A01K 5/0108; A01K 5/0128; A01K 5/0135; A01K 5/0225; A01K 5/0233; A01K 5/0241; A01K 5/025; A01K 5/0266; A01K 5/0275; A01K 5/0291
See application file for complete search history.

(56) References Cited

U.S. PATENT DOCUMENTS 2,433,870 A * 1/1948 Socke ................ B65D 25/2826 220/757
2,673,551 A * 3/1954 Mcanly ................ A01K 39/012 119/52.1
2,691,361 A * 10/1954 Mcanly ................ A01K 5/0225 119/52.1
2,756,793 A * 7/1956 Tupper ................. B65D 43/022 220/281
2,789,532 A * 4/1957 Hoebing .................. A01K 5/01 119/51.01
3,137,274 A * 6/1964 Palmer ................. A01K 5/0142 119/657
3,324,833 A 6/1967 Clugston
D261,157 S * 10/1981 Wolf .............................. D99/36
4,637,344 A 1/1987 Peterson
D335,004 S * 4/1993 Poston ......................... D30/121
5,222,990 A * 6/1993 Elliott .................. A01K 5/0114 119/61.2
5,323,734 A 6/1994 Meadows
D396,331 S * 7/1998 Niemetz ...................... D30/124
7,798,100 B2 9/2010 Bryant
7,891,317 B2 * 2/2011 Bodenstab ........... A01K 5/0225 119/51.01
8,272,350 B1 * 9/2012 England ................. A01K 5/025 222/485
2013/0133582 A1 * 5/2013 Cheng .................. A01K 39/012 119/51.01
2021/0392858 A1 * 12/2021 Sharp ................... A01K 39/012

FOREIGN PATENT DOCUMENTS

CN 206061847 4/2017
CN 118370225 7/2024

* cited by examiner

*Primary Examiner* — Ebony E Evans

(57) ABSTRACT

A lidded feed cover for facilitating filling of a feeder for mid to small size animals includes a feeder having bottom wall, a top wall, and a peripheral wall extending between the bottom wall and the top wall to define an interior space. The top wall is angled relative to the bottom wall such that the top wall is not parallel to the bottom wall and extends upwardly from a front side of the feeder to a rear side of the feeder. The peripheral wall has a feed opening. A fill opening is positioned in the top wall. A perimeter flange extends upwardly from the top wall around the fill opening. A lid is engageable to the feeder covering the fill opening.

12 Claims, 4 Drawing Sheets

LIDDED FEED COVER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to livestock feed covers and more particularly pertains to a new feed cover for facilitating filling of a feeder for mid to small size animals in which a feed opening may be too small to allow for efficient filling of the feeder.

(2) Description of Related Art Including Information Disclosed Under 37 CFR 1.97 and 1.98

The prior art relates to livestock feed covers. Known feeders for mid to small size animals, such as goats, may provide a vertical opening for the animal to access the feed.

These vertical openings can be difficult to use for filling the feeder.

BRIEF SUMMARY OF THE INVENTION

An embodiment of the disclosure meets the needs presented above by generally comprising a feeder having bottom wall, a top wall, and a peripheral wall extending between the bottom wall and the top wall to define an interior space. The top wall is angled relative to the bottom wall such that the top wall is not parallel to the bottom wall and extends upwardly from a front side of the feeder to a rear side of the feeder. The peripheral wall has a feed opening. A fill opening is positioned in the top wall. A perimeter flange extends upwardly from the top wall around the fill opening. A lid is engageable to the feeder covering the fill opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
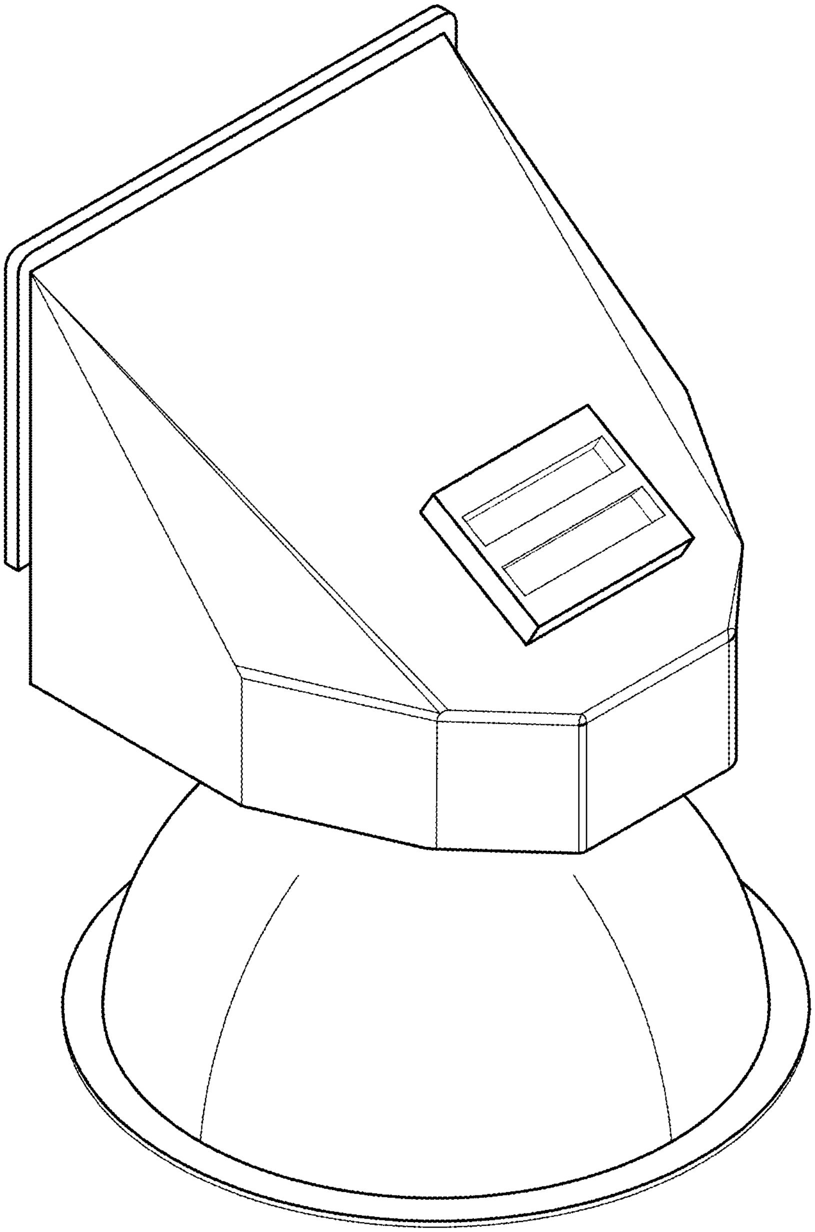
FIG. 1 is a top front perspective view of a lidded feed cover according to an embodiment of the disclosure.
Figure 2:
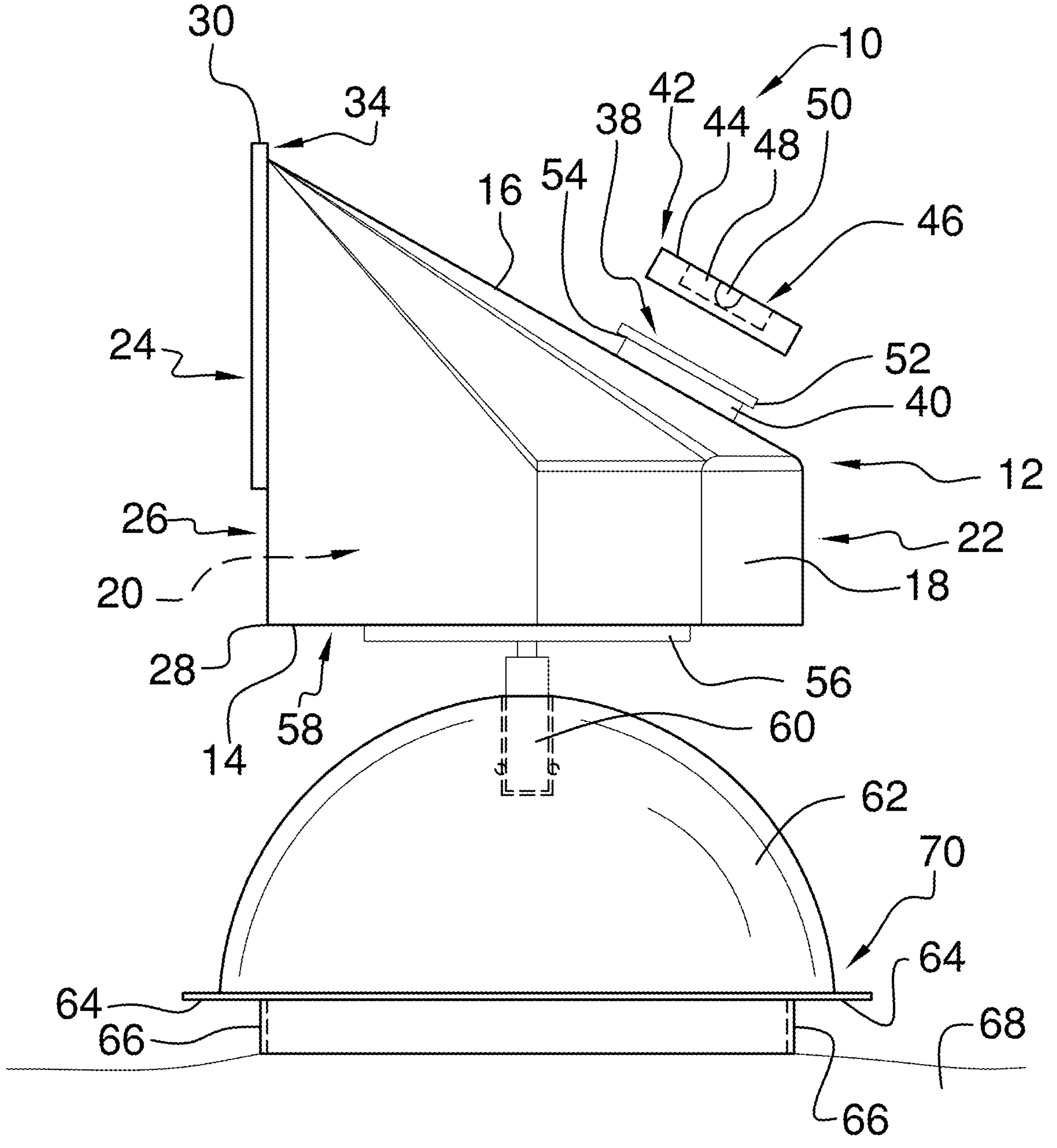
FIG. 2 is a side view of an embodiment of the disclosure.
Figure 3:
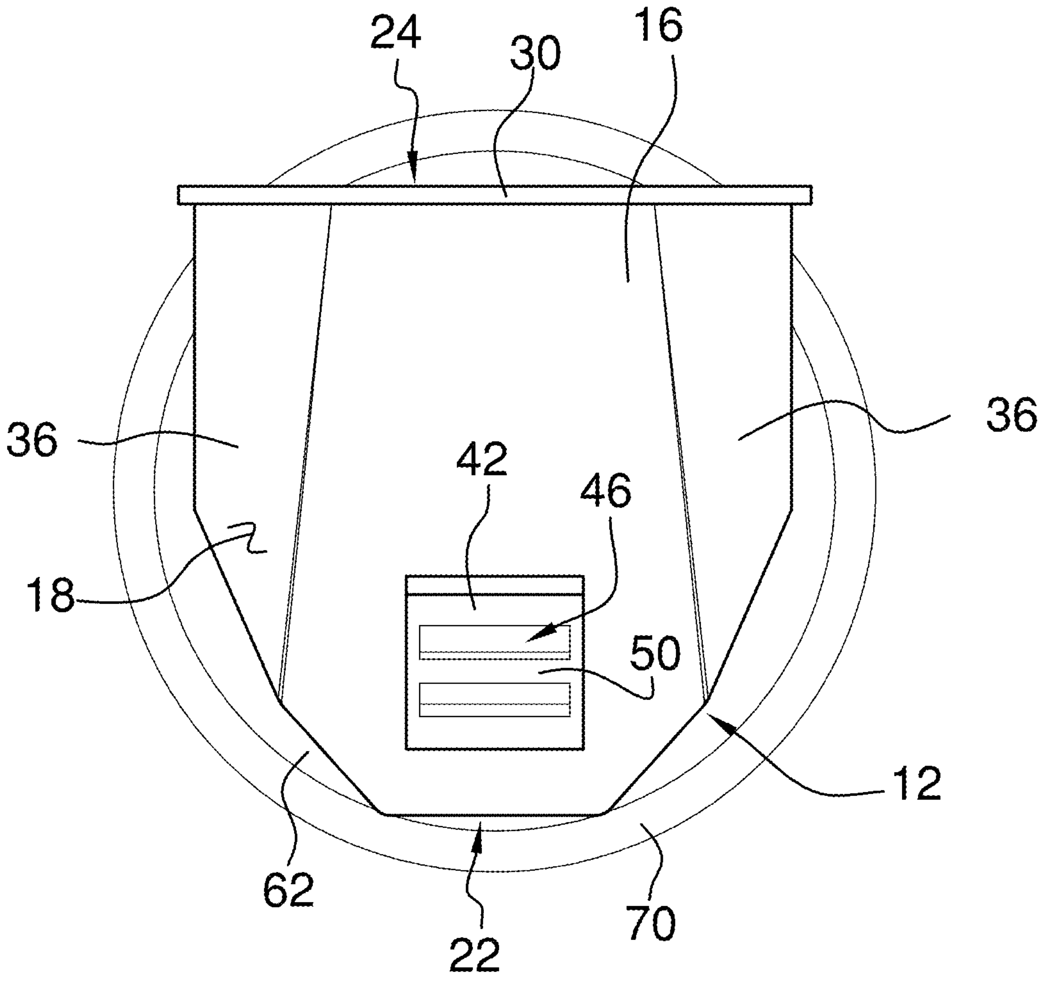
FIG. 3 is a top view of an embodiment of the disclosure.
Figure 4:
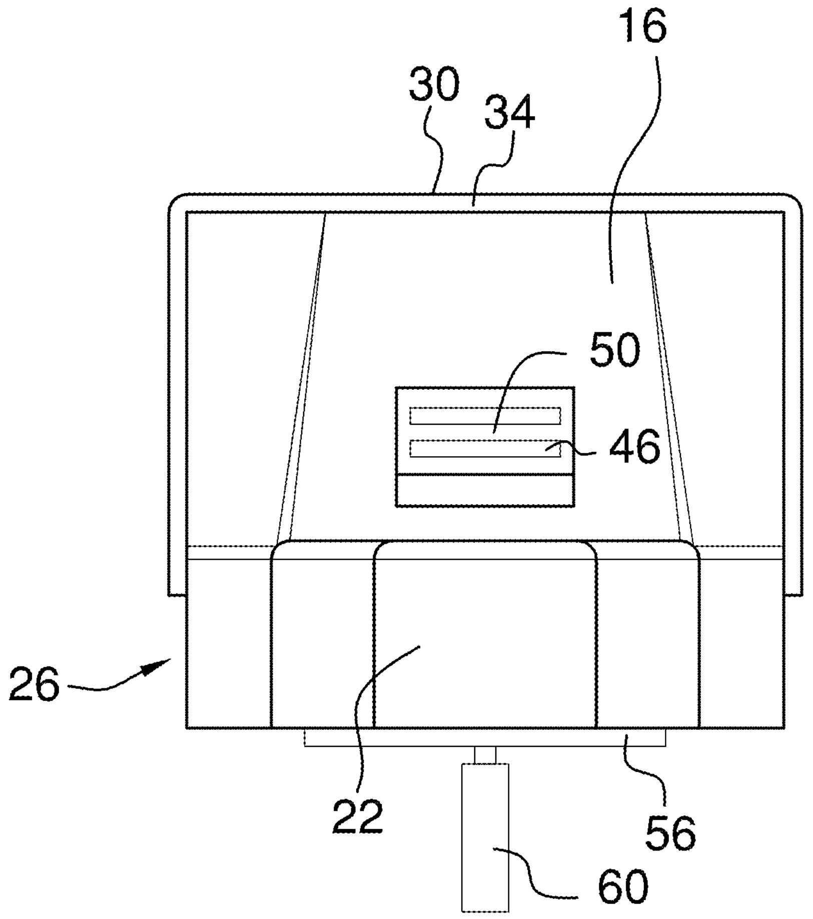
FIG. 4 is a front view of an embodiment of the disclosure.

With reference now to the drawings, and in particular to FIGS. 1 through 4 thereof, a new livestock feed covers embodying the principles and concepts of an embodiment of the disclosure and generally designated by the reference numeral 10 will be described.

As best illustrated in FIGS. 1 through 4, the lidded feed cover 10 generally comprises a feeder 12 having bottom wall 14, a top wall 16, and a peripheral wall 18 extending between the bottom wall 14 and the top wall 16 to define an interior space 20. The top wall 16 is angled relative to the bottom wall 14 such that the top wall 16 is not parallel to the bottom wall 14. The top wall 16 extends upwardly from a front side 22 of the feeder 12 to a rear side 24 of the feeder 12. The top wall 16 is angled between 20 and 40 degrees relative to the bottom wall 14, and may be exactly a 30 degree angle. The peripheral wall 18 has a feed opening 26. The feed opening 26 is positioned on the rear side 24 of the feeder 12. The feed opening 26 has a lower border 28 aligned with the bottom wall 14 of the feeder 12. The top wall 16 connects to the peripheral wall 18 on the rear side 24 of the feeder 12 spaced downwardly from a top edge 30 of the peripheral wall 18 defining a rear ledge 34 extending up from the top wall 16. The peripheral wall 18 of the feeder 12 has lateral facets 36 between the front side 22 of the feeder 12 and the rear side 24 of the feeder 12. The lateral facets 36 of the peripheral wall 18 form a tapering of the feeder 12 from the rear side 24 to the front side 22.

A fill opening 38 is positioned in the top wall 16. A perimeter flange 40 is coupled to and extends upwardly from the top wall 16 around the fill opening 38. A lid 42 is engageable to the feeder 12 covering the fill opening 38. The lid 42 includes an upper surface 44 and a well 46 extending into a central portion 48 of the upper surface 44. A handle 50 is coupled to the lid 42. The handle 50 is positioned within the well 46. A lip 52 is coupled to the perimeter flange 40. The lip 52 is positioned along a distal edge 54 of the perimeter flange 40 relative to the top wall 16. The lip 52 frictionally engages the lid 42 when the lid 42 is in a closed position covering the fill opening 38.

A plate 56 is coupled to an outer surface 58 of the bottom wall 14 of the feeder 12. A pin 60 is coupled to and extends downwardly from the plate 56. The pin 60 couples the feeder to a base 62. The pin 60 is rotatable relative to the base 62 wherein the plate 56 rotates freely relative to the base 62 whereby the feeder 12 is rotatable relative to the base 62. The pin 60 is offset from a center of gravity of the feeder 12 wherein the feeder 12 is configured to be rotated by wind, facilitated by the angling of the top wall 16 and the lateral facets 36 described above. The pin 60 is positioned closer to the front side 22 of the feeder 12 wherein the feeder 12 is configured to rotate the feed opening 26 facing away from wind blowing against the feeder 12. A bottom 70 of the base 62 extends laterally outward relative to the bottom wall 14 of the feeder 12. The bottom 70 of the base 62 is constructed of angle iron having a lateral flange 64 extending outwardly and a peripheral flange 66 extending downwardly away relative to the feeder 12 such that the peripheral flange 66 is configured for positioning on a support surface 68. The bottom 70 of the base 62 is annular wherein the bottom 70 of the base 62 is configured for facilitating rolling of the base 62 on a support surface for moving the feeder 12.

In use, the feeder 12 is moved to a desired location. The lid 42 is removed and the feeder 12 can be filled with feed through the fill opening 38. Angling of the top wall 16 and sizing of the fill opening 38 facilitate filling the feeder 12 as compared to known feeders. The shape of the feeder 12 and offset pin 60 allow the feeder 12 to be rotated automatically by wind to keep the feed opening 26 out of the wind.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lidded feed device comprising:

a feeder having bottom wall, a top wall, and a peripheral wall extending between the bottom wall and the top wall to define an interior space, the top wall being angled relative to the bottom wall such that the top wall is not parallel to the bottom wall and extend upwardly from a front side of the feeder to a rear side of the feeder, said peripheral wall having a feed opening;

a fill opening positioned in said top wall;

a perimeter flange coupled to and extending upwardly from said top wall around said fill opening;

a lid, said lid being engageable to said feeder covering said fill opening;

a plate coupled to an outer surface of said bottom wall of said feeder; and a pin coupled to and extending downwardly from said plate; and a base, said pin engaging and being rotatable relative to said base wherein said plate rotates freely relative to said base whereby said feeder is rotatable relative to said base.

2. The lidded feed device of claim 1, further comprising a lip coupled to said perimeter flange, said lip being positioned along a distal edge of said perimeter flange relative to said top wall, said lip frictionally engaging said lid when said lid is in a closed position covering said fill opening.

3. The lidded feed device of claim 1, further comprising:

said lid having an upper surface;

a well extending into a central portion of said upper surface; and a handle coupled to said lid, said handle being positioned within said well.

4. The lidded feed device of claim 1, further comprising said pin being offset from a center of gravity of said feeder wherein said feeder is configured to be rotated by wind.

5. The lidded feed device of claim 4, further comprising:

said feed opening being positioned on said rear side of said feeder; and said pin being positioned closer to said front side of said feeder wherein said feeder is configured to rotate said feed opening facing away from wind blowing against said feeder.

6. The lidded feed device of claim 5, further comprising said top wall connecting to said peripheral wall on said rear side of said feeder spaced downwardly from a top edge of said peripheral wall defining a rear ledge extending up from said top wall.

7. The lidded feed device of claim 1, further comprising said top wall being angled between 20 and 40 degrees relative to said bottom wall.

8. The lidded feed device of claim 1, further comprising a bottom of said base extending laterally outward relative to said bottom wall of said feeder.

9. The lidded feed device of claim 8, further comprising said bottom of said base being constructed of angle iron having a lateral flange extending outwardly and a peripheral flange extending downwardly away relative to said feeder such that said peripheral flange is configured for positioning on a support surface.

10. The lidded feed device of claim 8, further comprising said bottom of said base being annular wherein said bottom of said base is configured for facilitating rolling of said base on a support surface for moving said feeder.

11. The lidded feed device of claim 1, further comprising said peripheral wall of said feeder having lateral facets between said front side of said feeder and said rear side of said feeder, said lateral facets of said peripheral wall forming a tapering of said feeder from said rear side to said front side.

12. A lidded feed device comprising:

a feeder having bottom wall, a top wall, and a peripheral wall extending between the bottom wall and the top wall to define an interior space, the top wall being angled relative to the bottom wall such that the top wall is not parallel to the bottom wall and extend upwardly from a front side of the feeder to a rear side of the feeder said top wall being angled between 20 and 40 degrees relative to said bottom wall, said peripheral wall having a feed opening, said feed opening being positioned on said rear side of said feeder, said top wall connecting to said peripheral wall on said rear side of said feeder spaced downwardly from a top edge of said peripheral wall defining a rear ledge extending up from said top wall, said peripheral wall of said feeder having lateral facets between said front side of said feeder and said rear side of said feeder, said lateral facets of said peripheral wall forming a tapering of said feeder from said rear side to said front side;

a fill opening positioned in said top wall;

a perimeter flange coupled to and extending upwardly from said top wall around said fill opening;

a lid, said lid being engageable to said feeder covering said fill opening, said lid including an upper surface, a well extending into a central portion of said upper surface;

a handle coupled to said lid, said handle being positioned within said well;

a lip coupled to said perimeter flange, said lip being positioned along a distal edge of said perimeter flange relative to said top wall, said lip frictionally engaging said lid when said lid is in a closed position covering said fill opening;

a plate coupled to an outer surface of said bottom wall of said feeder;

a base;

a pin coupled to and extending downwardly from said plate, said pin engaging and being rotatable relative to said base wherein said plate rotates freely relative to said base whereby said feeder is rotatable relative to said base, said pin being offset from a center of gravity of said feeder wherein said feeder is configured to be rotated by wind, pin being positioned closer to said front side of said feeder wherein said feeder is configured to rotate said feed opening facing away from wind blowing against said feeder; and a bottom of said base extending laterally outward relative to said bottom wall of said feeder, said bottom of said base being constructed of angle iron having a lateral flange extending outwardly and a peripheral flange extending downwardly away relative to said feeder such that said peripheral flange is configured for positioning on a support surface, said bottom of said base being annular wherein said bottom of said base is configured for facilitating rolling of said base on a support surface for moving said feeder.

* * * * *